Oct. 1, 1968  R. L. LICH  3,403,637
VARIABLE GAUGE RAILWAY TRUCK
Filed March 23, 1967  3 Sheets-Sheet 1

INVENTOR
RICHARD L. LICH
by Bedell & Burgess
ATTORNEYS

Oct. 1, 1968 R. L. LICH 3,403,637
VARIABLE GAUGE RAILWAY TRUCK
Filed March 23, 1967 3 Sheets-Sheet 2
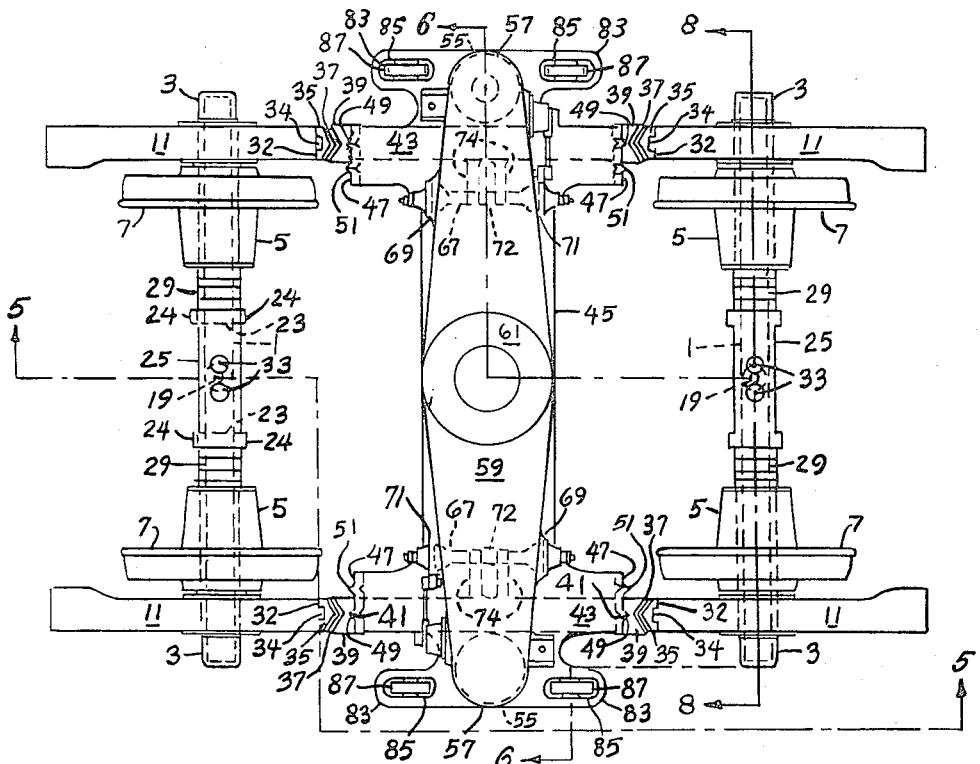
FIG.4
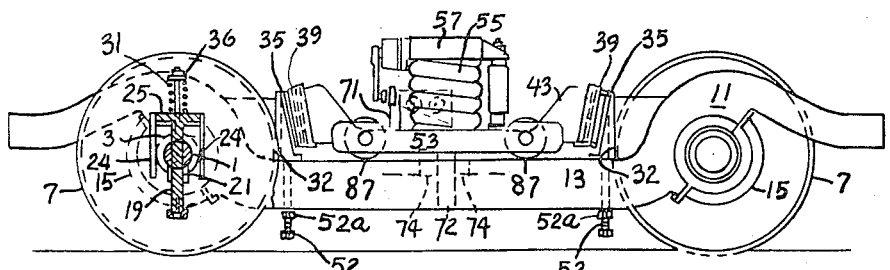
FIG.5
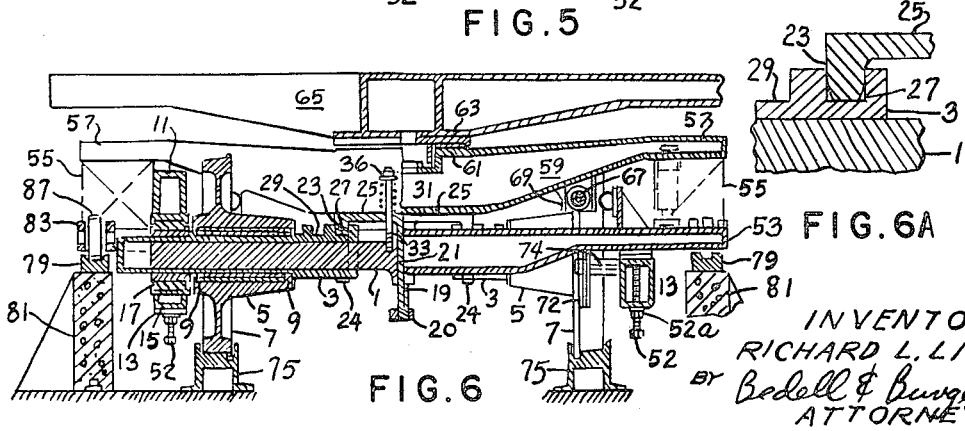
FIG.6A
FIG.6
INVENTOR
RICHARD L. LICH
BY Bedell & Burgess
ATTORNEYS United States Patent Office 3,403,637
Patented Oct. 1, 1968

3,403,637
VARIABLE GAUGE RAILWAY TRUCK
Richard L. Lich, Pasadena Hills, Mo., assignor to General Steel Industries, Inc., Granite City, Ill., a corporation of Delaware
Filed Mar. 23, 1967, Ser. No. 625,498
28 Claims. (Cl. 105—178)

ABSTRACT OF THE DISCLOSURE

A railway vehicle truck having side frame and wheel assemblies movable transversely of the truck with respect to each other and lockable in different positions transversely of the truck whereby to vary the wheel gauge, and stationary means for locking and unlocking said assemblies and moving them transversely to conform to changes in the track gauge.

---

The invention relates to railway rolling stock and consists particularly in variable gauge railway trucks and apparatus for changing their gauge in accordance with changes in track gauge.

Throughout the world, numerous track gauges are used on commercial railways, varying from as narrow as 60 centimeters, to as wide as 66 inches. Frequently, lines of different gauges connect with each other; e.g. the standard (56½ inch) gauge lines of Western Europe connect with the Spanish lines of 66 inch gauge and with Eastern European lines of 60 inch gauge. At the connecting points, passengers and goods are usually transferred from cars of one gauge to those of the other, with considerable loss of time, expense and inconvenience. In some instances car bodies and their loads are transferred from trucks of one gauge to trucks of the other gauge. This is also a time-consuming, inconvenient and expensive operation. Some attempts have also been made in the past to vary the wheel gauge on the same trucks, usually by sliding the wheels transversely of the axles, but none of these has been entirely successful.

Among the objects of the invention are the provision of automatic means for changing the wheel gauge of railway vehicles while the vehicles are in transit, the provision of means for removing the vehicle body load from the wheels during the gauge changing operation, the provision of means for maintaining all the vehicle parts centered transversely of the track during the gauge changing operation, and the provision of truck structure wherein the wheels at each side and the adjacent side frames form units movable transversely of the vehicle with respect to the supported truck structure to effect the gauge change.

The foregoing and additional more detailed objects and advantages will be evident from the following description of the invention and the accompanying drawings, in which:

FIG. 4 is a plan view of a car truck made according to the invention and adjusted for broad gauge track.

FIG. 5 is a side elevation view of the truck illustrated in FIG. 4, partially longitudinally vertically sectionalized along line 5—5 of FIG. 4.

FIG. 6 is a transverse vertical sectional view along line 6—6 of FIG. 4.

FIG. 6A is an enlarged fragmentary vertical sectional view corresponding to FIG. 6 but showing only adjacent portions of the axle, sleeve and locking device.

Figure 1:
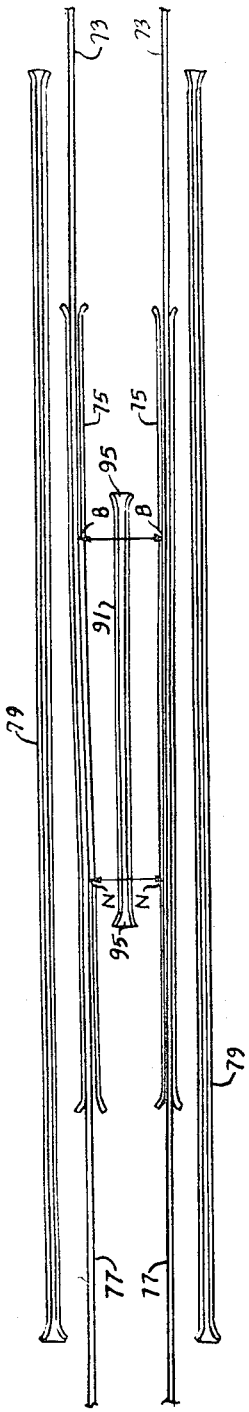
FIG. 1 is a plan view of the gauge-changing track sections and associated fixed structure of the invention.

Throughout the following description, the term "narrow gauge" will refer to the narrower of two gauges, and the term "broad gauge" to the broader gauge, even though one of the gauges might, in practice, be the "standard" gauge (56½ inch) used generally throughout North America, Western Europe (except the Iberian Peninsula), and to some extent elsewhere.

The truck comprises a pair of longitudinally spaced, transversely extending cylindrical axles 1, on the ends of which are axially slidably mounted sleeves 3, and on the latter are rotatably mounted extended hub portions 5 of flanged track wheels 7, preferably by means of anti-friction bearings 9, spaced apart transversely of the truck, which also serve as thrust bearings to hold wheels 7 against axial movement on sleeves 3.

Outwardly of wheels 7, upstanding end portions 11 of longitudinally extending side frames are clamped to the protruding ends of sleeves 3 by means of semicircular end caps 15, the opposing surfaces of the side frame end portions 11, end caps 15 and sleeves 3 being annularly channelized to accommodate annular grommets 17 of elastomeric material, which serve to cushion the side frame from the full effect of impacts transmitted to the wheels by vertical track irregularities.

It will be evident from the foregoing that sleeves 3, wheels 7 and side frames 13 are movable transversely of the truck as units to accommodate gauge changes.

For locking the wheels 7 in any selected gauge, a T-shaped locking member is provided on each axle, with its vertical stem 19 slidably received in a vertical aperture 21 through the center of the axle and the depending terminals 23 of its plate-like crossarms 25 selectively receivable in any of a plurality of upwardly open recesses 27 and 29 formed in the flat upper surfaces of sliding sleeves 3 near the inner ends thereof and spaced apart transversely of the truck. While two such recesses are disclosed, to accommodate adjustment of the wheels to two different track gauges; under some circumstances three or more similar recesses could be provided to make possible operation of the truck on more than two different track gauges. For maintaining the locking member crossarm 25 aligned with the axle, its terminals 23 are downwardly bifurcated to form depending extensions 24 vertically slidably engageable with opposite sides of sleeve 3. Locking member 19, 23, 25 is normally biased downwardly toward engagement with recesses 27 or 29 by coil springs 31 mounted above crossarm 25 on bolts 33 which extend upwardly from axles 1 and through holes in locking member crossarm 25. Springs 31 are held in compression against crossarms 25 by washers 36 seated against the heads of bolts 33. With this arrangement the wheels can be locked in narrow gauge position by engaging terminals 23 of locking member crossarms 25 with inner recesses 27 of wheel sleeves 3, the latter can be unlocked by lifting terminals 23 out of recesses 27, and the wheels can be locked in broad gauge position by permitting springs 31 to seat terminals 23 in outer recesses 29. It will be noted from FIG. 6A that the sides of crossarm terminals 23 are beveled near their lower ends to facilitate their admission into recesses 27 and 29. For purposes which will appear more fully hereafter, stem 19 is provided with a widened bottom terminal 20.

Side frames 13 are formed, longitudinally inwardly of upstanding end portions 11, with vertical abutment surfaces 32 facing inwardly lengthwise of the truck and having vertical ribs 34. Spring seat members 35 are formed with vertical back surfaces slidably engageable with surfaces 32a, horizontal bottom surfaces seated on the side frames and front surfaces slightly inclined upwardly and outwardly lengthwise of the truck. The front surfaces of seats 35 are of V cross section in plan with their apices pointed lengthwise of the truck toward the center of the side frames. Similarly oriented chevron springs 27, comprising V-section pads of elastomeric material interleaved with V-shaped steel plates are fixed to each seat 35 and mount, on their inwardly directed faces, similarly inclined caps 39.

Caps 39 are formed with small V-shaped grooves 41 in their transverse faces directed toward the center of the side frames, the apices of grooves 41 lying in the longitudinal vertical plane bisecting each side frame.

A transverse frame of I-shape in plan, comprising longitudinally extending side members 43, and transverse transom member 45, is formed at the ends of each of the former with longitudinally outwardly facing plane surfaces 47 inclined inwardly and downwardly lengthwise of the truck and thus extending parallel to the adjacent grooved faces of caps 39.

Figure 8:
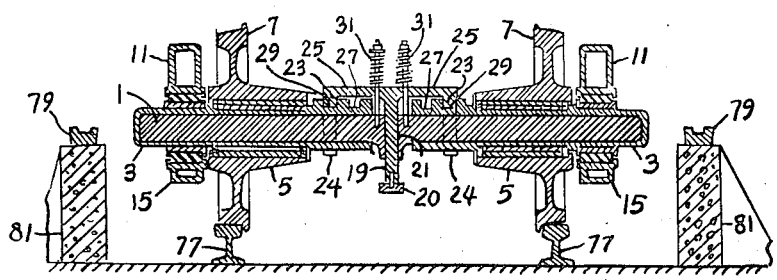
FIG. 8 is a transverse vertical sectional view along line 8—8 of FIG. 4 but showing the truck locked in narrow gauge adjustment.
Figure 9:
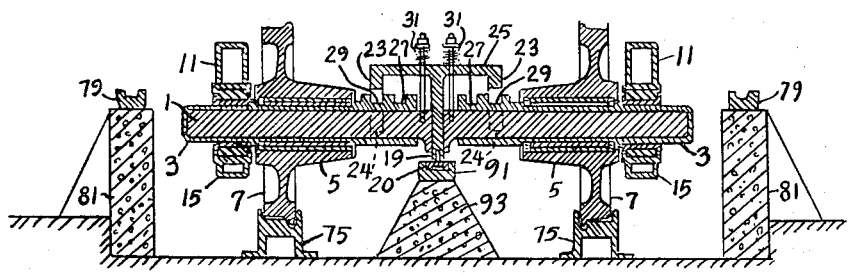
FIG. 9 is a transverse vertical sectional view corresponding to FIG. 8 but showing the truck unlocked to accommodate gauge change.

Surfaces 47 are each formed with a transversely spaced pair of V-shaped ribs 49 and 51 with their apices lying in vertical planes longitudinal of the truck. The spacing between V-shaped ribs 49 and 51 at each side is equal to half the difference in wheel gauges for which the truck is adapted, so that, when the wheels are set at the broad gauge position as seen in FIGS. 1 and 8 and at the right hand side of FIG. 3, frame surfaces 47 will seat against the opposing surfaces of caps 39 and grooves 41 in caps 39 mate with laterally outward ribs 49, and conversely, when the wheels are set at the narrow gauge position, as seen at the left side of FIG. 3 and in FIGS. 8 and 9, grooves 41 in caps 39 will mate with laterally inboard ribs 51, and in either position, frame 43, 45 will be supported on side frames 13 through chevron springs 37, the latter yielding sufficiently in shear vertically to permit different tilting movements of the side frames relative to the main frame to accommodate differing vertical irregularities of the two track rails and thus provide load equalization. Purely vertical impacts will be cushioned by a combination of shear and compression in the pads. Relative lateral movements of the transverse frame and side frame will be opposed by resistance of the pads to compression transversely of the truck.

In order to compensate for wheel wear by elevating the frame amounts equal to wear of the wheel treads, beneath each chevron seat 35, the side frames are formed with threaded vertical holes, in which vertical bolts 52 are threadably received with their heads protruding below the side frames and their upper ends abuttingly engageable with the bottoms of chevron seats 35. As wheel wear progresses, bolts 52 can be screwed upwardly through the side frames to raise chevron seats 35 and nuts 52a tightened against the bottoms of the side frames to lock bolts 52 in raised position.

Transom member 45 is extended laterally outboard of frame side members 43 to form seats 53 for upstanding springs, on which are supported the end portions 57 of transverse bolster 59, the center of which is formed with an upwardly facing central bearing 61. Truck central bearing 61 mates with a downwardly facing body central bearing 63, depending from body bolster 65 of a supported car body underframe. In order to accommodate vertical and lateral movements of truck bolster 59 relative to frames 43, 45 but prevent their relative movements lengthwise of the truck and thus transmit draft and retardation forces between them, a pair of transversely spaced, longitudinally extending anchor links 67 preferably of the type disclosed in an application of James C. Travilla, Serial No. 527,842, filed February 16, 1966, now Patent No. 3,315,555, issued April 25, 1967 and assigned to the assignee of the instant application, are connected at their opposite ends to depending brackets 69 on the bolster and upstanding brackets 71 on frame transom member 45.

For maintaining the side frames in alignment with truck frame 43, 45 when the truck frame is raised off the chevron caps for gauge changing, transom 45 is formed with depending projections inwardly of the side frames and the latter are formed with a pair of longitudinally spaced inwardly extending projections 74 slidably embracing transom projection 72.

Figure 2:
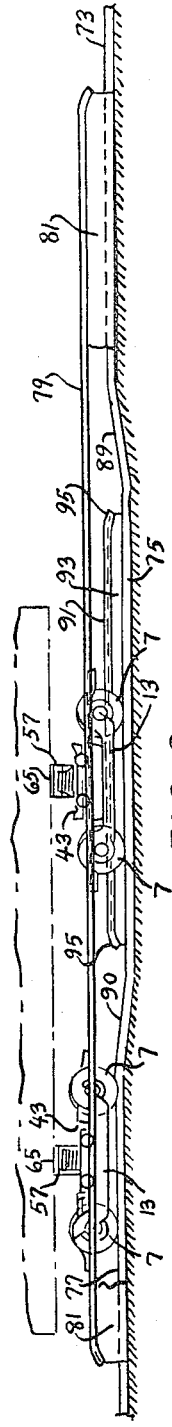
FIG. 2 is a side elevation view of the structure illustrated in FIG. 1.
Figure 3:
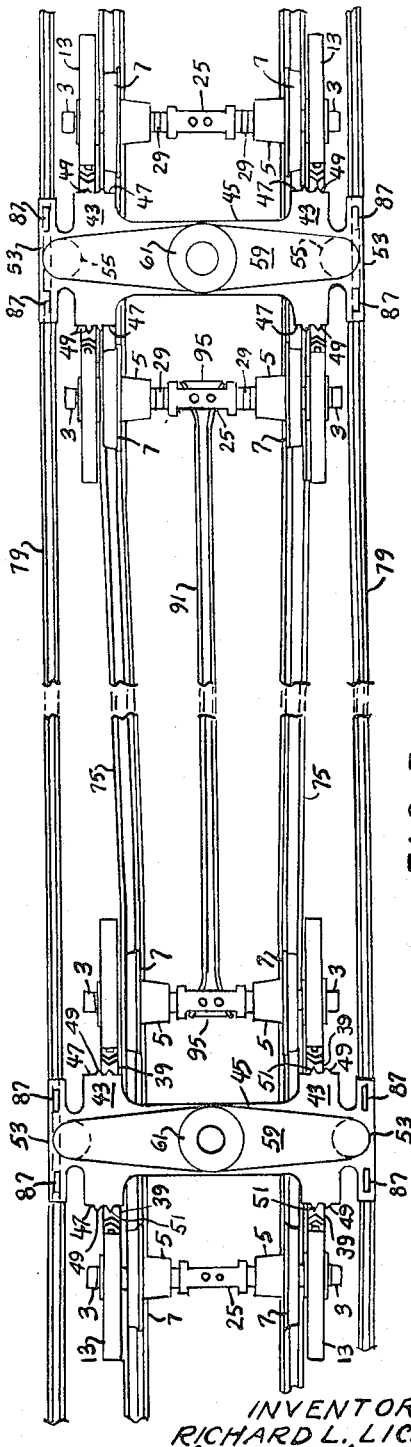
FIG. 3 is an enlarged plan view of a portion of the structure illustrated in FIG. 1, showing a pair of trucks each adjusted to a different wheel gauge.
Figure 7:
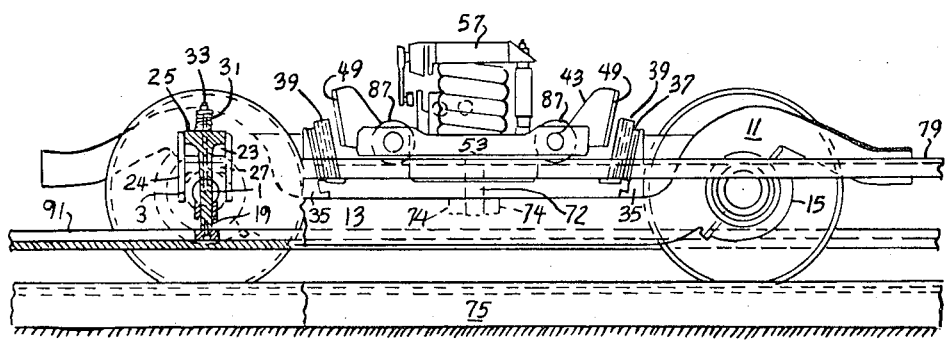
FIG. 7 is a side elevational view of the truck illustrated in FIGS. 4–6 taken along line 5—5 of FIG. 4 but showing the transverse frame and axle lock in gauge-changing position.

In order to effectuate automatic change of wheel gauge for trains in transit, the stationary structure shown in FIGS. 1–3 is provided at the gauge change points.

The broad gauge track comprises running rails 73, of the usual T-section, spaced apart a distance B, B, which are connected to transition rails 75. The latter preferably have heads formed with a flangeway groove and upstanding rims at each side engageable with the inner and outer surfaces of the car wheel rims to effect more positive guidance of the wheels than that effected solely by the wheel flanges.

Between points B, B and points N, N, the track formed by transition rails 75 tapers gradually to the narrow gauge N, N, and transition rails 75 continue some distance beyond this point to a connection with narrow gauge running rails 77, also of the usual T-section.

Outwardly of rails 73, 75, 77, upwardly open channel section rails 79 are mounted on supports 81 at a level above the running rails 73 and 77 slightly below that of the outboard ends 53 of the truck frame, and the latter are widened lengthwise of the truck as at 83 and apertured at 85 to rotatably mount rollers 87, spaced apart lengthwise of the truck and receivable in the channels of outside rails 79.

Transition rails 75 are depressed to a lower level than running rails 73 and 77 throughout the transition region between gauge end points B and N and for some distance in both directions from the transition region with gradual inclines 89 and 91 connecting the depressed track to the normal level track.

With the track arrangement described above, as a car is pulled along the track, rollers 87 will maintain the truck frame, bolster and car body at their normal height above the level of running rails 73 and 77, and wheels 7 will drop to the lower level, and with them will drop axles 1, sleeves 3, side frames 11, 13, chevron supporting seats 35, chevrons 37 and chevron supported caps 39, vertically separating the latter from truck frame side member surfaces 47 whereby to permit the side frames to move transversely to their other gauge position, e.g. from the broad gauge position shown at the right in FIG. 3, with chevron supported caps 39 engaging the outer frame ribs 49, to the narrow gauge position, with caps 39 engaging the inner frame ribs 51, or the converse, if train movement is in the opposite direction.

In order to permit the transverse movement of the side frames, sleeves 3 and wheels 7, and to maintain axles 1 centered transversely with respect to outside rails 81 and the truck frame, bolster and car body structure supported thereby, an upwardly facing channel center rail 91 is mounted on elevating support structure 93 between transition rails 75 and extends throughout the transition region and a short distance in both directions lengthwise of the track therefrom. The terminals 93 of center rail 91 are widened and bent downwardly to a lower level than the normal sleeve-locking position of the bottom of T-shaped locking member stem 19 and the major portion of rail 91 between terminals 95 is at a sufficiently higher level than the normal sleeve-locking position by an amount at least slightly greater than the depths of grooves 27 and 29 in sleeves 3, so that as the truck passes over center rail 91, it will lift lock 19, 25 up until terminals 23 on lock crossarm 25 clear grooves 27 and 29 and thus permit inward or outward movement of the sleeves on axles 1. Lateral movement of axles 1 is prevented by engagement of the ends of bottom terminal 20 on stem 19 of the locking member with the upstanding sides of channel-section center rail 91 and the axles are thus maintained in transversely centered relation with respect to the truck frame, bolster and car body structure.

Thus, as the car moves through the gauge changing trackwork and each truck moves into the depressed region, the weight of the truck frame, bolster and body is taken off the side frames by the support of the truck frame, through rollers 87 on outside rails 79 and the side frames, axle sleeves, wheels and axles drop into the depression, with resultant separation of chevron caps 39 from cooperating faces 47 or 49 on the truck frame. When these truck parts drop into the depression, T-shaped locking member 19, 25 is raised by engagement with the sloping terminal 95 of center rail 91, freeing sleeves 3 for movement transversely of the truck. During this movement, draft forces will be transmitted from the body to the bolster through central bearing 61, 63, from bolster 57 through anchor links 67 to the truck frame and from the latter to the side frames by cooperating projections 72 and 74. Depending on the direction of movement of the car, the cooperating vertical surfaces of transition rails 75, 75 causes wheels 7, sleeves 3, and side frames 13 to move transversely inwardly or outwardly to the narrow NN or broad BB gauge position (FIG. 8 or 6 respectively). When each T-shaped locking member 19, 25 reaches the end of center rail 91, the locking member drops to the locked position with its crossarm terminals 23, 23 seated in grooves 29 or 27, respectively, thus locking the wheels, sleeves and side frames in the changed gauge position. As the wheels, sleeves, axles and side frames climb out of the depression to the normal track level, the truck frame 43, 45, supported at the normal truck level by outside rails 79 and rollers 87 and the side frames are again joined as chevron spring caps 39 become engaged with mating truck frame surfaces 49 or 47, the full load of the truck frame and supported car body being transferred to the chevrons and through them to the side frames, sleeves and wheels when the truck moves past the end of outside rails 79.

Thus the gauge change is accomplished on each succeeding truck, solely by pulling cars equipped with trucks of the type described herein through the gauge changing track section.

The details of the trucks and of the gauge changing track construction may be varied substantially without departing from the spirit of the invention and the exclusive use of those modifications coming within the scope of the appended claims is contemplated.

What is claimed is:

1. A railway vehicle truck comprising longitudinally spaced pairs of transversely spaced wheels, separate side frames spaced apart transversely of the truck and supported at their ends from said wheels, a pair of spring devices spaced apart lengthwise of the truck comprising seats carried on said side frames and having transverse surfaces inclined upwardly in opposite directions lengthwise of the truck, elastomeric pad elements secured to said seats, and a transverse frame member resiliently supported on said pads, cooperating guide means on said seats and side frames for fixing the positions of said seats longitudinally and transversely of said side frames, and vertical screw means threadably mounted in said side frames beneath said seats and underlying engageable with the bottoms of said seats for raising the same to compensate for wheel wear.

2. A railway vehicle truck comprising a pair of transverse axles spaced apart lengthwise of the truck, sleeves mounted on the ends of said axles for movement transversely of the truck, flanged wheels journaled on each of said sleeves in fixed positions thereon transversely of the truck, a pair of transversely spaced longitudinally extending side frames mounted at their ends on said sleeves, a transverse frame, means disengageably supporting said transverse frame on said side frames intermediate the ends of the latter and adapted to support said transverse frame on said side frames at alternative locations spaced apart transversely of said transverse frame, and means for locking the sleeves in selected positions transversely of the truck corresponding to the alternative transverse frame support locations.

3. A railway vehicle truck according to claim 2 wherein said support means include resilient elements.

4. A railway vehicle truck according to claim 3 wherein said resilient elements comprise elastomeric pads spaced apart lengthwise of the truck and inclined in opposite directions lengthwise of the truck whereby to transmit the vertical load of the transverse frame to the side frames through a combination of shear and compression in said pads and to accommodate lengthwise tipping of said side frames relative to said transverse frame primarily through shear in said pads.

5. A railway vehicle truck according to claim 4 wherein said elastomeric pads are V-shaped in plan with their apices directed longitudinally of the truck.

6. A railway vehicle truck according to claim 5 wherein said support means include caps secured to the upwardly facing inclined surfaces of said pads, and said transverse frame has a plurality of surfaces disposed transversely of the truck with respect to each other for alternative supporting engagement with said caps.

7. A railway vehicle truck according to claim 6 wherein said support means include seats carried by said side frames and having inclined surfaces supporting said pads, cooperating vertical guide means on said seats and side frames for fixing the position of said seats longitudinally and transversely of said side frames, and vertical screw means threadably mounted in said side frames beneath said seats and underlyingly engageable with said seats for raising the same to compensate for wheel wear.

8. A railway vehicle truck according to claim 2 wherein said locking means comprises an element vertically movable on each axle and elements on each sleeve and spaced apart transversely thereof lockingly engageable with said vertically movable element and disengageable therewith by vertical movement of the latter.

9. A railway vehicle truck according to claim 7 wherein said vertically movable elements comprise a vertical stem mounted on each axle between the sleeves and cross arms on said stem with depending terminals, said sleeve elements comprising upwardly extending projections forming a plurality of recesses between them, said depending terminals being selectively engaged with said recesses to lock the sleeves in their selected positions transversely of the truck.

10. A railway vehicle truck according to claim 9 wherein said stem projects below said axle for engagement with ground supported structure for lifting said crossarm terminals out of engagement with said sleeve recesses to permit transverse movements of said sleeves on said axles.

11. A railway vehicle truck according to claim 10 wherein each said stem has vertical surfaces engageable with spaced opposing vertical surfaces of ground supported structure for maintaining said stem and axle centered transversely of the truck suppporting track.

12. A railway vehicle truck according to claim 2 including elements on said transverse frame for supporting the latter independently of said wheels, sleeves, axles and side frames for longitudinal movement.

13. A railway vehicle truck according to claim 12 in which said transverse frame is formed with extensions projecting laterally outboard of said side frames and said independent supporting elements are rollers at each side spaced apart lengthwise of the truck and journaled in said transverse frame extensions.

14. The combination with a truck according to claim 13, including wheel supporting track rails of different gauges, wheel supporting transition rails connecting said different gauge track rails and being engageable with vertical surfaces of said wheels to shift them transversely from one gauge to the other, separate rails outside of said track and transition rails and engageable with said rollers during transition from one gauge to the other.

15. The combination according to claim 14 in which said outside rails are vertically spaced a sufficient distance from said wheel supporting rails in the transition region to lift said transverse frame off its support means on said side frames during transition from one gauge to the other.

16. The combination according to claim 15 wherein said vertical spacing is effected by maintaining said outside rails substantially level and depressing said wheel supporting rails in the transition region.

17. A railway vehicle truck according to claim 13 wherein said locking means comprises an element vertically movable on each axle and elements on each sleeve and spaced apart transversely of the truck lockingly engageable with said vertically movable element and disengageable therewith by upward movement of the latter, said vertically movable element having a portion depending from the associated axle and held against movement transversely of the truck with respect to the axle.

18. A railway vehicle truck according to claim 12 in which said supporting means comprise resilient devices mounted on said side frames and spaced apart lengthwise thereof.

19. A railway vehicle truck according to claim 18 in which said transverse frame has a plurality of downwardly facing surfaces at each side disposed transversely of the truck with respect to each other and alternatively engageable with said resilient devices.

20. A railway vehicle truck according to claim 19 in which said resilient devices are formed to oppose substantial relative movement of said transverse frame and said side frames transversely and longitudinally of the truck but to permit limited vertical movement of said transverse frame on said side frames and longitudinal tipping movement of said side frames relative to said transverse frame.

21. A railway vehicle truck according to claim 19 wherein said transverse frame is liftable from said side frames whereby to disengage said downwardly facing transverse frame surfaces from said resilient devices and accommodate movements of said side frames, sleeves and wheels transversely of the truck as required by changes in track gauge.

22. The combination with a truck according to claim 2 of ground supported structure including wheel supporting track rails of two different gauges, wheel supporting transition rails connecting said different gauge track rails and being engageable with vertical surfaces of said wheels to move them transversely from one gauge to the other, and means vertically disengaging said transverse frame from support on said side frames during transition from one gauge to the other and permitting their reengagement after the transition.

23. The combination with a truck according to claim 17, including wheel supporting track rails of different gauges, wheel supporting transition rails connecting said different gauge track rails and being engageable with vertical surfaces of said wheels to shift them transversely from one gauge to the other, separate rails outside of said track and transition rails and engageable with said rollers during transition from one gauge to another, said outside rails being sufficiently vertically spaced from said wheel supporting rails in the transition region to lift said transverse frame off its supporting means on said side frames during transition from one gauge to the other, and an inside rail underlyingly engageable with the depending portion of said vertically movable element throughout the gauge transition region and at a sufficient height to raise said vertically movable element out of engagement with said sleeve elements throughout the transition region whereby to permit transverse movements of said sleeves and wheels as are induced by engagement of said transition rails with opposed vertical surfaces of the latter.

24. The combination according to claim 23 wherein said outside rails and said rollers have opposing vertical surfaces whereby to center said transverse frame transversely of the track and said inside rail and said locking member depending portion have opposing vertical surfaces whereby to center the associated axle transversely of the truck.

25. The combination according to claim 22 in which said ground supporting structure includes means releasing said sleeve locking means during transition from one gauge to the other and permitting said locking means to relock said sleeves in the changed gauge position after the transition.

26. A railway vehicle truck according to claim 2 wherein said transverse frame and each of said side frames are provided with cooperating means for transmitting draft forces between said transverse frame and said side frames while said transverse frame is disengaged from said load support means.

27. A railway vehicle truck according to claim 26 wherein said cooperating means comprises structure depending from said transverse frame and structure extending transversely from each of said side frames, said depending structure and said transversely extending structures having opposed surfaces extending transversely of the truck slidably engageable with each other.

28. A railway vehicle truck according to claim 27 wherein said depending structure comprises a single vertical elongated element near each side of the truck and each said transversely extending structure comprises a pair of elongated elements spaced apart longitudinally of the truck and slidably embracing one of said vertical elongated elements between them.

References Cited

UNITED STATES PATENTS

| | | | |
|---|---|---|---|
| 40,889 | 12/1863 | Tisdale | 105—178 |
| 94,874 | 9/1869 | Davidson | 105—178 |
| 111,933 | 2/1871 | Hipkins | 105—178 |
| 298,736 | 5/1884 | Dunbar et al. | 105—178 |
| 898,008 | 9/1908 | Sayer | 105—178 XR |
| 1,304,490 | 5/1919 | Knecht et al. | 104—33 |
| 1,563,530 | 12/1925 | Saunders | 104—33 |
| 2,346,370 | 4/1944 | Eustis et al. | 105—178 |
| 2,787,226 | 4/1957 | Couch | 105—178 |

ARTHUR L. LA POINT, *Primary Examiner.*

H. BELTRAN, *Assistant Examiner.*

PO-1050
(5/69)

UNITED STATES PATENT OFFICE
CERTIFICATE OF CORRECTION

Patent No. 3,403,637             Dated October 1, 1968

Inventor(s) Richard L. Lich

It is certified that error appears in the above-identified patent and that said Letters Patent are hereby corrected as shown below:

Column 2, line 64, "narrow" should read --broad--;

line 68, "broad" should read --narrow--.

Signed and sealed this 11th day of May 1971.

(SEAL)
Attest:

EDWARD M. FLETCHER, JR.
Attesting Officer

WILLIAM E. SCHUYLER, JR.
Commissioner of Patents